United States Patent
Seo et al.

(10) Patent No.: US 7,734,154 B2
(45) Date of Patent: Jun. 8, 2010

(54) RECORDING MEDIUM HAVING DATA STRUCTURE FOR MANAGING REPRODUCTION DURATION OF STILL PICTURES RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1105 days.

(21) Appl. No.: 10/766,193

(22) Filed: Jan. 29, 2004

(65) Prior Publication Data

US 2004/0184310 A1      Sep. 23, 2004

(30) Foreign Application Priority Data

Feb. 14, 2003   (KR)   ................. 10-2003-009486

(51) Int. Cl.
*H04N 5/00* (2006.01)
*H04N 5/91* (2006.01)
*H04N 7/00* (2006.01)

(52) U.S. Cl. ..................... 386/125; 386/95; 386/96; 386/126

(58) Field of Classification Search ................. 386/46, 386/95, 125, 126, 68, 96
See application file for complete search history.

(56) References Cited

U.S. PATENT DOCUMENTS

| 4,164,760 | A | | 8/1979 | Inaba et al. |
| 5,854,873 | A | | 12/1998 | Mori et al. |
| 5,870,523 | A | | 2/1999 | Kikuchi et al. |
| 5,884,004 | A | | 3/1999 | Sato et al. |
| 5,907,658 | A | | 5/1999 | Murase et al. |
| 5,999,698 | A | | 12/1999 | Nakai et al. |
| 6,122,436 | A | * | 9/2000 | Okada et al. ................. 386/126 |
| 6,148,138 | A | | 11/2000 | Sawabe et al. |
| 6,157,769 | A | * | 12/2000 | Yoshimura et al. ............ 386/68 |
| 6,266,483 | B1 | | 7/2001 | Okada et al. |
| 6,285,826 | B1 | | 9/2001 | Murase et al. |

(Continued)

FOREIGN PATENT DOCUMENTS

AU              6672298            9/1998

(Continued)

OTHER PUBLICATIONS

International Search Report, PCT/KR2004/000200.

(Continued)

*Primary Examiner*—Thai Tran
*Assistant Examiner*—Hung Q Dang
(74) *Attorney, Agent, or Firm*—Harness, Dickey & Pierce, P.L.C.

(57) ABSTRACT

The data structure includes a data area storing presentation data multiplexed into a transport stream. The presentation data is divided into a number of still picture units, and each still picture unit includes at least one still picture and associated related data. The related data does not include audio data. A navigation area of the recording medium stores at least one playlist. The playlist includes at least one playitem. The playitem indicates at least one of the still picture units to reproduce and provides duration information for display of the still picture in the still picture unit.

19 Claims, 10 Drawing Sheets

U.S. PATENT DOCUMENTS

| | | | |
|---|---|---|---|
| 6,308,005 | B1 | 10/2001 | Ando et al. |
| 6,341,196 | B1 | 1/2002 | Ando et al. |
| 6,353,702 | B1 * | 3/2002 | Ando et al. .................. 386/95 |
| 6,369,835 | B1 | 4/2002 | Lin |
| 6,374,037 | B1 | 4/2002 | Okada et al. |
| 6,385,389 | B1 | 5/2002 | Maruyama et al. |
| 6,393,430 | B1 | 5/2002 | Van Ryzin |
| 6,400,893 | B1 | 6/2002 | Murase et al. |
| 6,442,337 | B1 | 8/2002 | Okada et al. |
| 6,470,460 | B1 | 10/2002 | Kashiwagi et al. |
| 6,493,504 | B1 | 12/2002 | Date et al. |
| 6,529,683 | B2 | 3/2003 | Mori et al. |
| 6,532,335 | B2 | 3/2003 | Otomo et al. |
| 6,574,419 | B1 | 6/2003 | Nonomura et al. |
| 6,580,870 | B1 * | 6/2003 | Kanazawa et al. ........... 386/95 |
| 6,594,442 | B1 | 7/2003 | Kageyama et al. |
| 6,748,415 | B1 | 6/2004 | Sugimoto |
| 6,798,976 | B2 | 9/2004 | Tsumagari et al. |
| 6,816,189 | B2 | 11/2004 | Nagaoka et al. |
| 6,823,010 | B1 | 11/2004 | Curet et al. |
| 6,829,211 | B2 | 12/2004 | Sako et al. |
| 6,856,756 | B1 | 2/2005 | Mochizuki et al. |
| 6,919,925 | B2 | 7/2005 | Kudo |
| 6,943,684 | B2 | 9/2005 | Berry |
| 6,975,363 | B1 | 12/2005 | Baldwin et al. |
| 6,992,710 | B2 | 1/2006 | Nagaoka |
| 6,999,674 | B1 | 2/2006 | Hamada et al. |
| 7,054,545 | B2 | 5/2006 | Ando et al. |
| 7,158,175 | B2 | 1/2007 | Belz et al. |
| 7,224,890 | B2 | 5/2007 | Kato |
| 7,343,052 | B2 | 3/2008 | Roth et al. |
| 2001/0000809 | A1 | 5/2001 | Ando et al. |
| 2001/0016112 | A1 | 8/2001 | Heo et al. |
| 2001/0043790 | A1 | 11/2001 | Saeki et al. |
| 2001/0046371 | A1 | 11/2001 | Ando et al. |
| 2001/0056580 | A1 | 12/2001 | Seo et al. |
| 2002/0025143 | A1 | 2/2002 | Kashiwagi et al. |
| 2002/0035575 | A1 | 3/2002 | Taira et al. |
| 2002/0085022 | A1 | 7/2002 | Masuda et al. |
| 2002/0110369 | A1 | 8/2002 | Mori et al. |
| 2002/0126994 | A1 | 9/2002 | Gunji et al. |
| 2002/0127001 | A1 | 9/2002 | Gunji et al. |
| 2002/0130896 | A1 | 9/2002 | Spence et al. |
| 2002/0135607 | A1 | 9/2002 | Kato et al. |
| 2002/0135608 | A1 | 9/2002 | Hamada et al. |
| 2002/0145702 | A1 * | 10/2002 | Kato et al. ..................... 352/1 |
| 2002/0164152 | A1 | 11/2002 | Kato et al. |
| 2002/0172496 | A1 | 11/2002 | Gunji et al. |
| 2002/0176695 | A1 | 11/2002 | Sawabe et al. |
| 2003/0014760 | A1 | 1/2003 | Yamauchi et al. |
| 2003/0235406 | A1 | 12/2003 | Seo et al. |
| 2004/0047607 | A1 | 3/2004 | Seo et al. |
| 2004/0057700 | A1 | 3/2004 | Okada et al. |
| 2004/0081434 | A1 | 4/2004 | Jung et al. |
| 2004/0141436 | A1 * | 7/2004 | Monahan ................. 369/47.24 |
| 2004/0179820 | A1 | 9/2004 | Kashiwagi et al. |
| 2004/0184780 | A1 | 9/2004 | Seo et al. |
| 2004/0213552 | A1 | 10/2004 | Kato |
| 2005/0019007 | A1 | 1/2005 | Kato et al. |
| 2005/0025461 | A1 | 2/2005 | Kato et al. |
| 2005/0066352 | A1 | 3/2005 | Herley |
| 2005/0105888 | A1 | 5/2005 | Hamada et al. |
| 2005/0163463 | A1 | 7/2005 | Schick et al. |
| 2005/0196143 | A1 | 9/2005 | Kato et al. |
| 2005/0201718 | A1 | 9/2005 | Kato |
| 2005/0254363 | A1 | 11/2005 | Hamada et al. |
| 2006/0188223 | A1 | 8/2006 | Ikeda et al. |
| 2006/0195633 | A1 | 8/2006 | Plourde, Jr. |
| 2006/0288302 | A1 | 12/2006 | Yahata et al. |

FOREIGN PATENT DOCUMENTS

| | | |
|---|---|---|
| AU | 2003282415 | 6/2004 |
| CN | 1063863 | 4/1996 |
| CN | 1240293 | 1/2000 |
| CN | 1245956 A | 3/2000 |
| CN | 1245957 A | 3/2000 |
| CN | 1263672 | 8/2000 |
| CN | 1300022 | 6/2001 |
| CN | 1303094 | 7/2001 |
| CN | 1304533 | 7/2001 |
| CN | 1381137 | 11/2002 |
| DE | 69907758 | 2/2004 |
| DE | 60002774 | 3/2004 |
| EP | 0856849 | 8/1998 |
| EP | 0978994 | 2/2000 |
| EP | 1 003 337 | 5/2000 |
| EP | 1045393 | 10/2000 |
| EP | 0 949 825 B1 | 11/2000 |
| EP | 1 056 092 | 11/2000 |
| EP | 1 056 094 | 11/2000 |
| EP | 1102270 A1 | 5/2001 |
| EP | 1113439 | 7/2001 |
| EP | 1128386 A2 | 8/2001 |
| EP | 0942609 | 10/2001 |
| EP | 1198133 A1 | 4/2002 |
| EP | 1 204 269 A1 | 5/2002 |
| EP | 1 286 544 | 2/2003 |
| EP | 1300851 | 4/2003 |
| EP | 1041566 | 5/2003 |
| FR | 2581771 | 11/1986 |
| GB | 2119151 | 11/1983 |
| GB | 2 359 210 | 8/2001 |
| JP | 1-300777 | 12/1989 |
| JP | 1300777 | 12/1989 |
| JP | 05-137114 | 6/1993 |
| JP | 06-311481 | 11/1994 |
| JP | 07-057436 | 3/1995 |
| JP | 07-262646 | 10/1995 |
| JP | 9-017101 | 1/1997 |
| JP | 09-252450 | 9/1997 |
| JP | 9-261584 | 10/1997 |
| JP | 10-154373 | 6/1998 |
| JP | 11-213628 | 8/1999 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-251402 | 9/2000 |
| JP | 2000-268537 | 9/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-056651 | 2/2002 |
| JP | 2002-082684 | 3/2002 |
| JP | 2002-158965 | 5/2002 |
| JP | 2002-158972 | 5/2002 |
| JP | 2002-208258 | 7/2002 |
| JP | 2002-325221 | 11/2002 |
| JP | 2002-354424 | 12/2002 |
| JP | 2003-016764 | 1/2003 |
| JP | 2003-045154 | 2/2003 |
| JP | 2003-299015 | 10/2003 |

| | | |
|---|---|---|
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| RU | 2229174 | 5/2004 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |
| WO | WO 00/74061 A1 | 12/2000 |
| WO | WO 01/11626 | 2/2001 |
| WO | WO 01/82608 | 11/2001 |
| WO | WO 02/062061 | 8/2002 |
| WO | WO 2004/023234 A2 | 3/2004 |
| WO | WO 2004/023484 A1 | 3/2004 |
| WO | WO 2004/023484 A1 | 3/2004 |
| WO | WO 2004/023485 A1 | 3/2004 |
| WO | WO 2004/066281 A1 | 8/2004 |
| WO | WO 2004/075194 A1 | 9/2004 |
| WO | WO 2004/086396 A1 | 10/2004 |

OTHER PUBLICATIONS

Chinese Office Action dated Oct. 31, 2008.
Chinese Office Action dated Dec. 5, 2008.
Japanese Office Action dated Sep. 24, 2008.
European Search Report dated Jul. 30, 2008.
ISO/IEC International Standard, Information Technology—Generic Coding of Moving Pictures and Associated Audio Information: Systems, Second Edition, Dec. 1, 2000.
Chinese Office Action dated Aug. 8, 2008.
Japanese Office Action dated Sep. 16, 2008.
Office Action for U.S. Appl. No. 10/716,629 dated Feb. 4, 2010.
Office Action for Japanese patent application No. 2004-533859 dated Oct. 20, 2009.
International Search Report for PCT/KR2004/000200 mailed May 20, 2004.
Office Action for Canadian patent application No. 2,474,229 dated Dec. 10, 2009.
Office Action for U.S. Appl. No. 10/716,629 dated Sep. 1, 2009.
European Telecommunications Standards Institute, "*Digital Video Broadcasting* (*DVB*); *Subtitling systems*", 1997, pp. 1-45.
Search Report for corresponding European Patent Application dated May 16, 2008.

* cited by examiner

FIG. 4
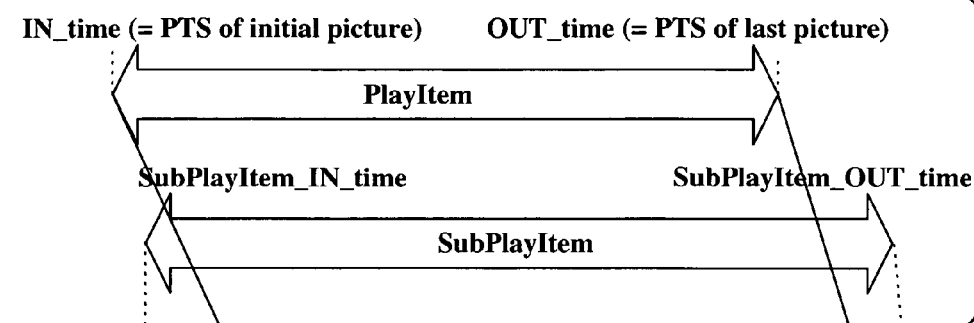
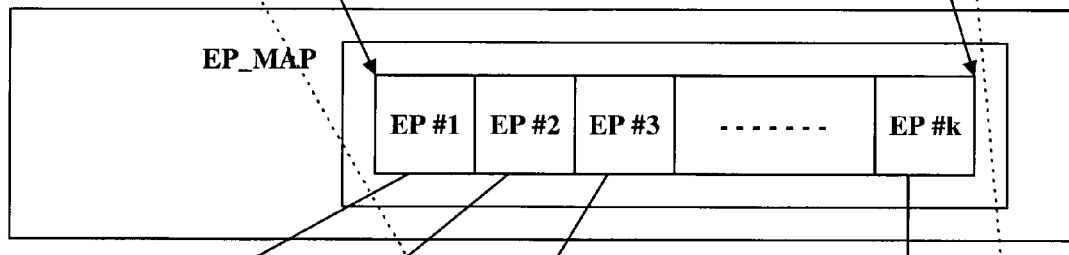
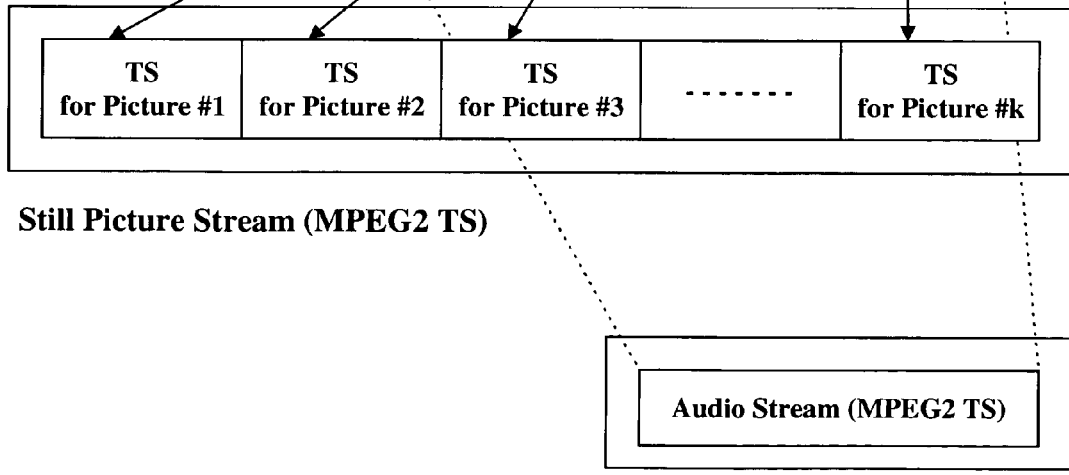

us 7,734,154 B2

RECORDING MEDIUM HAVING DATA STRUCTURE FOR MANAGING REPRODUCTION DURATION OF STILL PICTURES RECORDED THEREON AND RECORDING AND REPRODUCING METHODS AND APPARATUSES

FOREIGN PRIORITY

The present invention claims priority under 35 U.S.C. 119 on Korean Application No. 10-2003-009486 filed Feb. 14, 2003; the contents of which are incorporated by reference in their entirety.

BACKGROUND OF THE INVENTION

1. Field of the Invention

The present invention relates to a recording medium having a data structure for managing reproduction of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of at least still pictures recorded on the recording medium.

In one exemplary embodiment, a data area of the recording medium stores presentation data multiplexed into a transport stream. The presentation data is divided into a number of still picture units where each still picture unit includes at least one still picture and associated related data. Also in this embodiment, a navigation area stores at least one playlist, which includes at least one playitem. The playitem indicates at least one of the still picture units to reproduce and provides duration information for display of the still picture in the still picture unit.

In a further exemplary embodiment, a data area of the recording medium stores presentation data multiplexed into a transport stream in a first file and stores audio data in a second file. The presentation data is divided into a number of still picture units, and each still picture unit includes at least one still picture and associated related data. In this embodiment, a navigation area stores at least one playlist where the playlist includes at least one playitem and at least one sub-playitem. The playitem indicates at least one of the still picture units to reproduce from the first file and provides duration information for display of the still picture in the still picture unit. The sub-playitem provides navigation information for reproducing the audio data from the second file.

In one embodiment, the duration information of the above described embodiments indicates whether to display the still picture for one of a finite and an infinite period of time.

In an embodiment associated with any of the above described embodiments, the navigation area further includes a clip information file, which includes at least one entry point map. The entry point map includes an entry point associated with each still picture unit. Here, the duration information indicates whether to display the still picture for one of a finite and an infinite period of time. As such at least a number of the entry points each include a presentation time stamp associated with the still picture in the associated still picture unit such that, when the duration information indicates to display a still picture for a finite duration, the finite duration is determinable at least in part from the presentation time stamp in the entry point associated with the still picture and the presentation time stamp in the next entry point.

In yet another embodiment associated with any of the above described embodiments, each elementary stream of the still picture and associated related data is aligned within the still picture unit, and each elementary stream is a packetized elementary stream. In this embodiment, each still picture unit includes one packet from each packetized elementary stream. Here, the duration information indicates whether to display the still picture for one of a finite and an infinite period of time. As such, a number of the packets of the packetized elementary stream of still picture data each include a presentation time stamp such that, when the duration information indicates display of the still picture for a finite duration, the finite duration is determinable using the presentation time stamp in the packet of the still picture and a presentation time stamp in a next packet.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which:

FIGS. 3 and 4 illustrate a detailed embodiment of portions of the data structure in FIG. 1 and a method for managing still images of a high-density recording medium according to the present invention;

DESCRIPTION OF THE EMBODIMENTS

In order that the invention may be fully understood, exemplary embodiments thereof will now be described with reference to the accompanying drawings.

Figure 1:
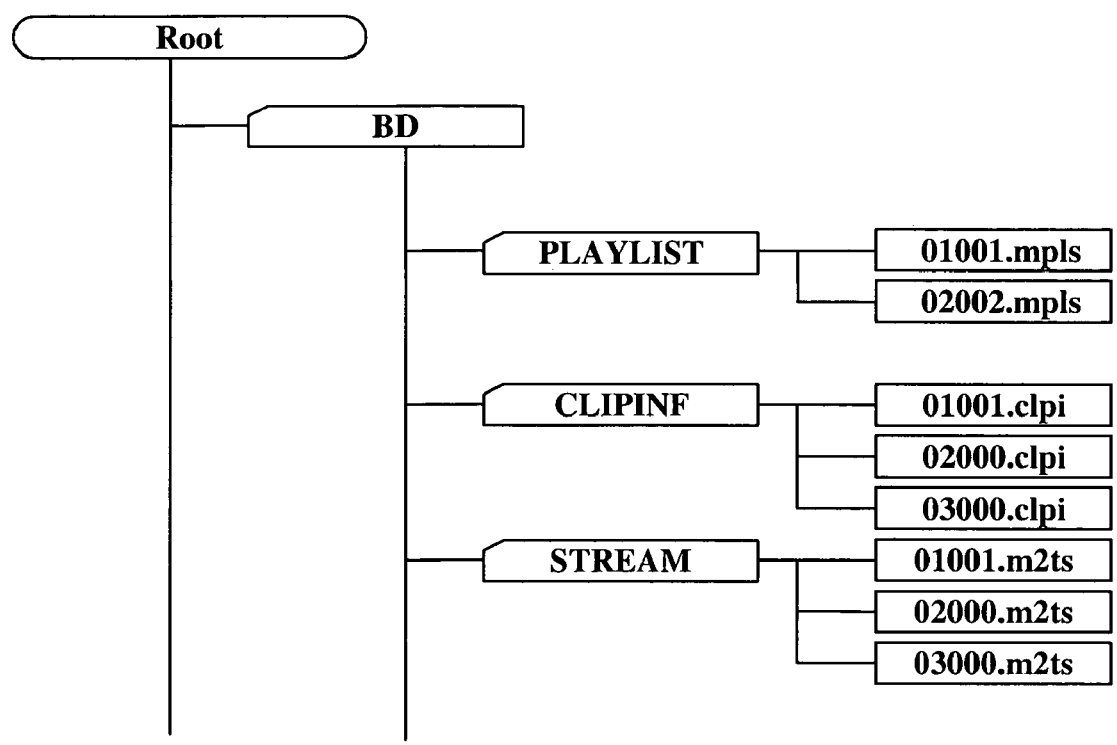
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
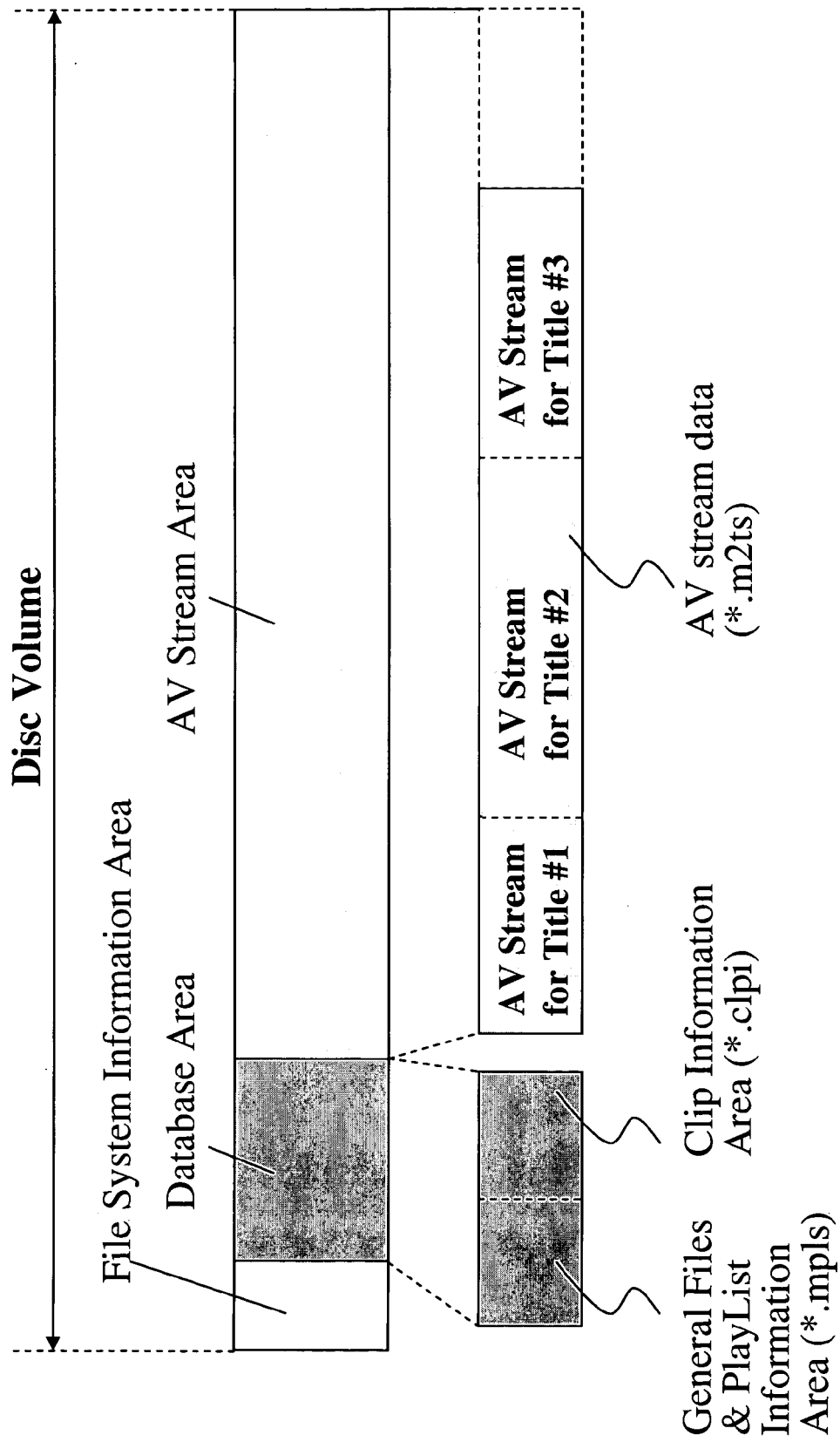
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
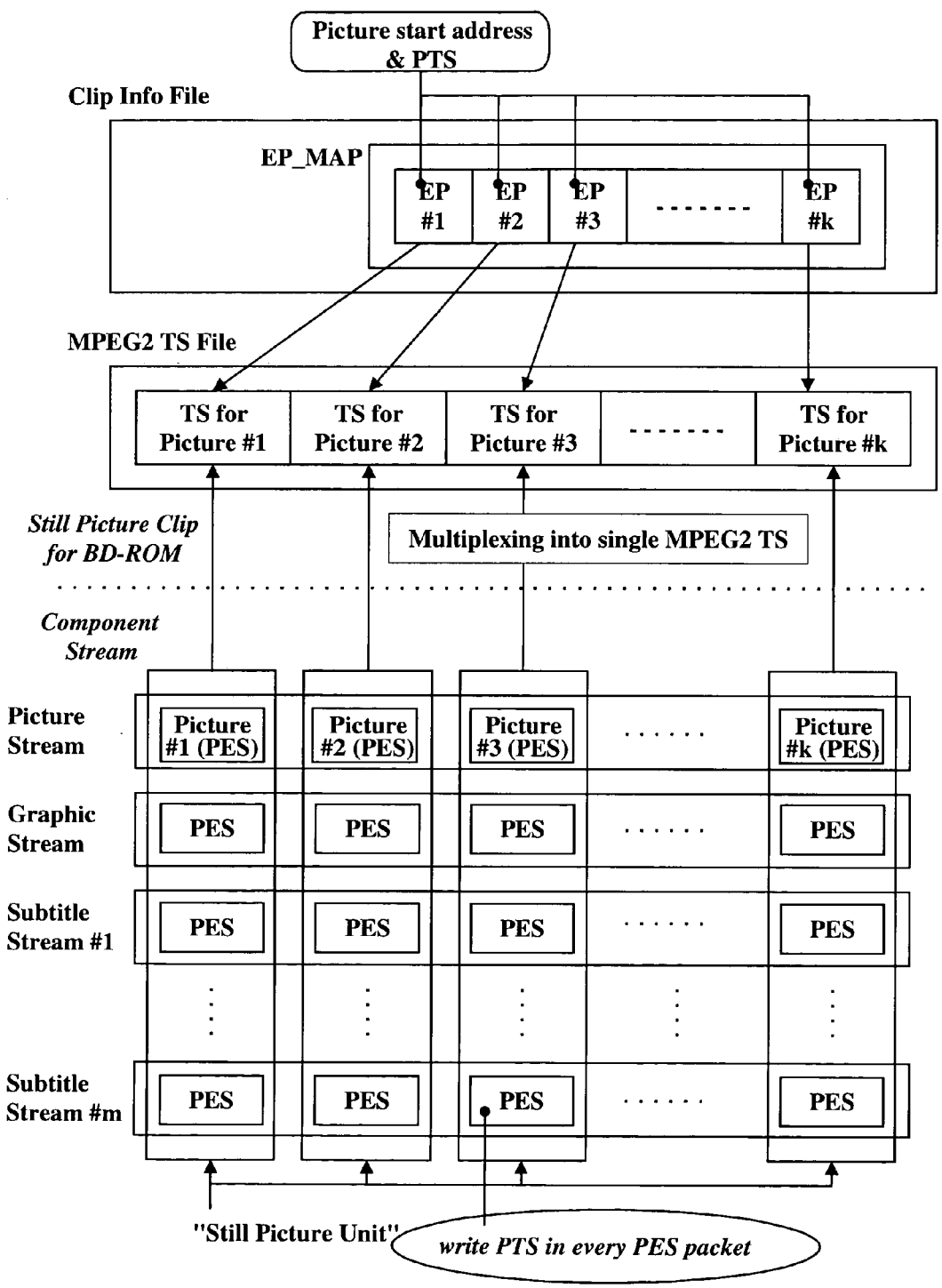

FIGS. 3 and 4 illustrate an embodiment of a data structure and method for managing still images of a high-density recording medium such as a BD-ROM. As shown in FIG. 3, a still picture stream and related data streams (e.g., the graphic & subtitle streams) are packetized into PES packets on a still image basis. Namely, each elementary stream is packetized into PES packets. A PES packet of the still picture stream includes a single still picture, and the associated PES packets of the related data include the related data associated with the still picture (e.g., for reproduction in synchronization with the associated still picture). As further shown in FIG. 3, a presentation time stamp (PTS) is included in the header area of each PES packet. As discussed in detail below, the PTSs may be used to calculate presentation duration of a still picture and/or to link with a playlist. The still picture together with the related data to be reproduced in synchronization therewith are grouped into a still picture unit. On a still picture unit basis, the still picture stream and related data streams are multiplexed into a still picture file of MPEG2 transport streams.

FIG. 3 further shows a clip information file corresponding to the still picture file. The clip information file includes an entry point map (EP_MAP). Individual entry points (EP #1~#k) in the EP map contain respective navigation information for accessing a head recording position of a corresponding still picture unit. The navigation information, for example, includes source packet number entry point start (SPN_EP_Start) information indicating the start recording position of the corresponding still picture unit and also includes a PTS of the still picture unit. As discussed in detail below, the PTSs may be used to calculate presentation duration of each still picture.

FIG. 4 illustrates a playlist for play control of the still picture file discussed above with respect to FIG. 3. As shown, a playitem (PlayItem) in the playlist contains in-time (IN_time) information and out-time (OUT_time) information corresponding respectively to the start position and end position of the still images in the still picture file to reproduce. As shown, the PTSs provided as the in-time information and out-time information by the playitem, link the playitem to the entry point map of the clip information file associated with the still picture stream. The in-time PTS is the PTS of the initial picture to be reproduced, which in this example corresponds to the still picture referenced by the first entry point EP #1, and the out-time PTS is the PTS of the last still picture to be reproduced, which in this example corresponds to the still picture referenced by the kth entry point EP #k.

A sub-playitem (SubPlayItem) in the playlist contains sub-playitem in-time (SubPlayItem_IN_time) information and sub-playitem out-time (SubPlayItem_OUT_time) information for a separate audio file to be reproduced in association with the still picture file. The audio data may be reproduced in either a synchronized or unsynchronized fashion with the associated still images.

Figure 5:
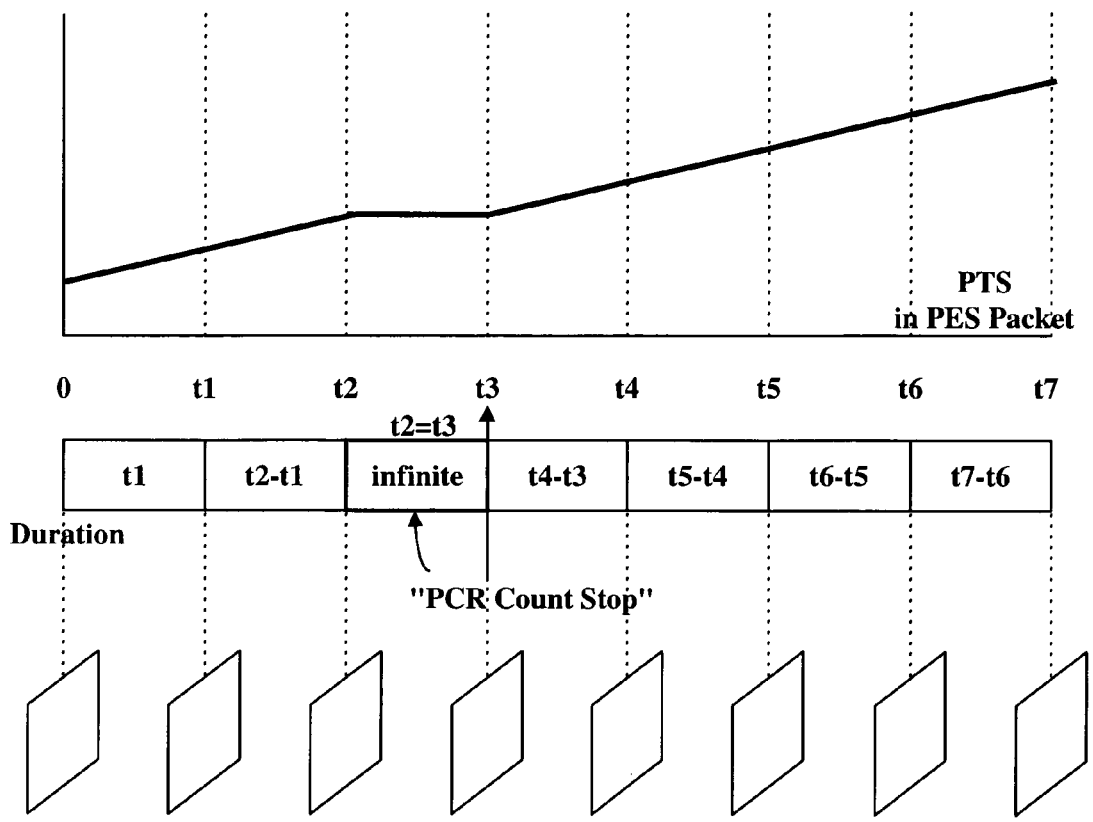
FIG. 5 shows the relationship between the PTSs for still pictures of finite and infinite duration.

FIG. 5 shows a PTS recorded in a PES packet has a value in proportion to, for example, the well-known program clock reference (PCR) count value. When a still picture has an infinite presentation duration, the PCR count maintains the same value and a PTS proportional thereto is recorded in the PES packet of the corresponding still picture. Accordingly, an identical PTS is recorded to both the PES packet of a still picture with infinite presentation duration and the PES packet of the next still picture, as shown in FIG. 5. For example, a reproducing apparatus may calculate the difference between the PTSs recorded in subsequent entry points or subsequent still picture PESs to determine presentation duration for the first of the two consecutive still pictures. When the difference between the PTSs is zero, the reproducing apparatus reproduces the corresponding still picture with infinite presentation duration—meaning that the still picture is reproduced until user input providing instructions to the contrary is received. Otherwise, the optical disk reproducing apparatus reproduces the still picture for the calculated duration.

In other words, the reproducing apparatus, at the time of, for example, reproducing slideshows of still pictures, decides whether the presentation duration for each still picture is infinite or finite. When the presentation duration corresponds to infinite, the reproducing apparatus does not increase the PCR count but maintains the previous value. On the contrary, when the presentation duration is finite, the reproducing apparatus conducts a series of operations to normally increase the PCR count.

Figure 6:
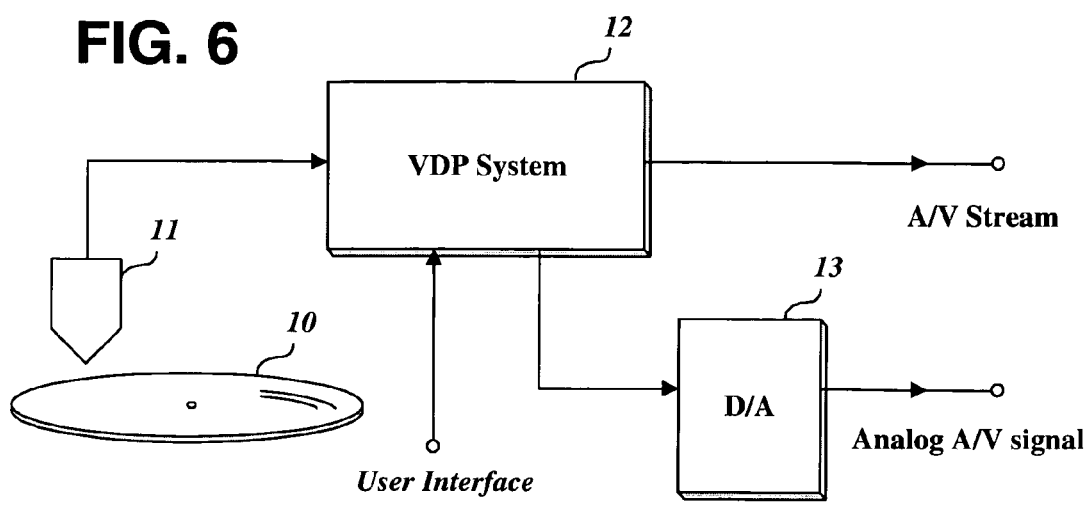
FIG. 6 illustrates a schematic diagram of a partial structure of an optical disc reproducing apparatus where the present invention is applied.

FIG. 6 illustrates a schematic diagram of a partial structure of an optical disc apparatus where the present invention is applied. As shown, the optical disc apparatus includes an optical pickup 11 for reproducing data from the an optical disk. A VDP (Video Disc Play) system 12 controls the reproduction operation of the optical pickup 11 and demodulates the data reproduced by the optical pickup 11. The VDP 12 produces an AV stream, which may also be fed to a D/A converter 13 to generate an analog version of the AV stream.

The VDP system 12 controls the optical pickup 11 and demodulates the reproduced data based on user input received from a user interface and the navigation and management information recorded on the optical disk in accordance with the present invention. For example, the VDP system 12 makes reference to a playlist and an entry point map included in a clip information file as described above to reproduce still pictures. Namely, the VDP system 12 reads out a still picture, graphic data, and subtitle data of each still picture unit according to the order of entry points (EP #1, #2, . . . ) recorded in the entry point map. Then, the VDP system 12 conducts a series of operations for reproducing slideshows, which may be reproduced for a finite or infinite duration according to PTSs included in the entry points of an entry point map or the PESs of the still pictures as described above. When the infinite duration is determined the associated still picture is displayed until user input is received, for example, over the user interface of the VDP system 12.

Figure 7:
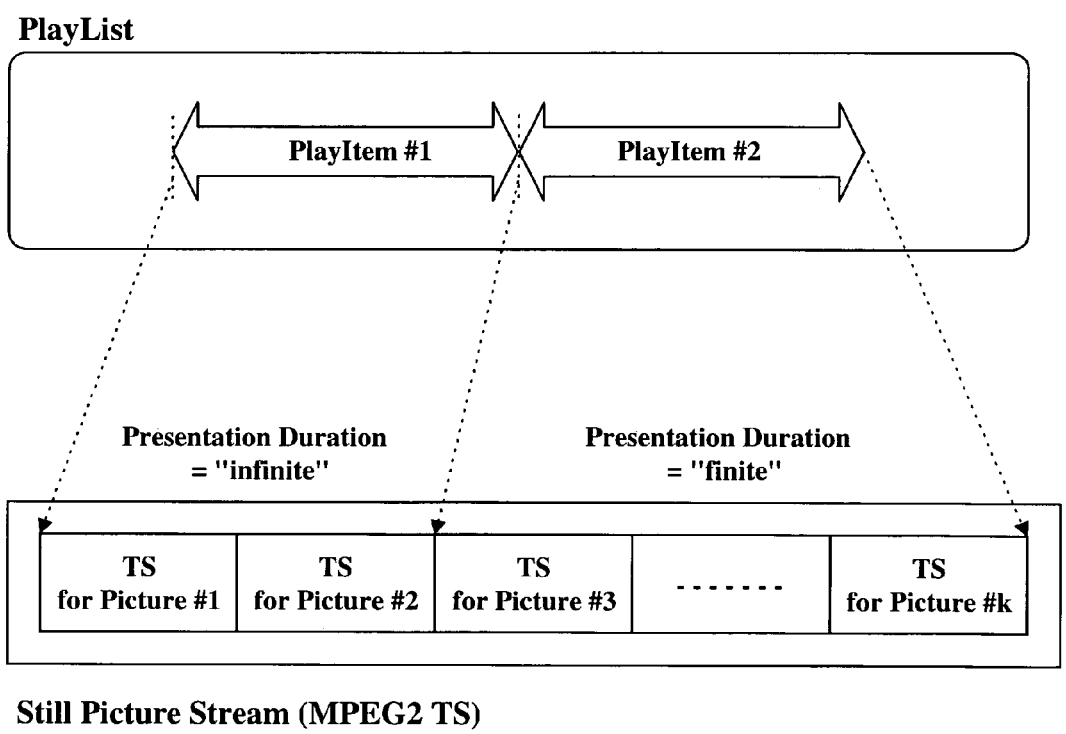
FIGS. 7-10 each illustrate a detailed embodiment of portions of the data structure in FIG. 1 and a method for managing still images of a high-density recording medium according to the present invention.

In another embodiment of the present invention, as shown in FIG. 7, multiple playitems to separately reproduce still pictures with distinctive presentation attributes are recorded and managed in a single playlist for play control of a still picture file.

For example, a first playitem may be linked to data streams of still picture units with infinite presentation duration, while a second playitem may be linked to data streams of still picture units with finite presentation duration.

Subsequently, when the VDP system 12 of an optical disc apparatus reproduces data streams of the still picture units linked to the first playitem, the VDP system 12 plays a data stream of each still picture unit and waits for the key input of the user.

On the other hand, when the VDP system 12 reproduces data streams of the still picture units linked to the second playitem, the VDP system 12 plays a data stream of each still picture unit, and as described above, conducts a series of operations to reproduce a data stream of a still picture unit according to either the elapse of the presentation duration determined by the difference of the PTSs included in the entry points (or PESs) or key input of the user.

While duration has been given as an example of a presentation attribute, it will be understood that the present invention is not limited to this example.

Figure 8:
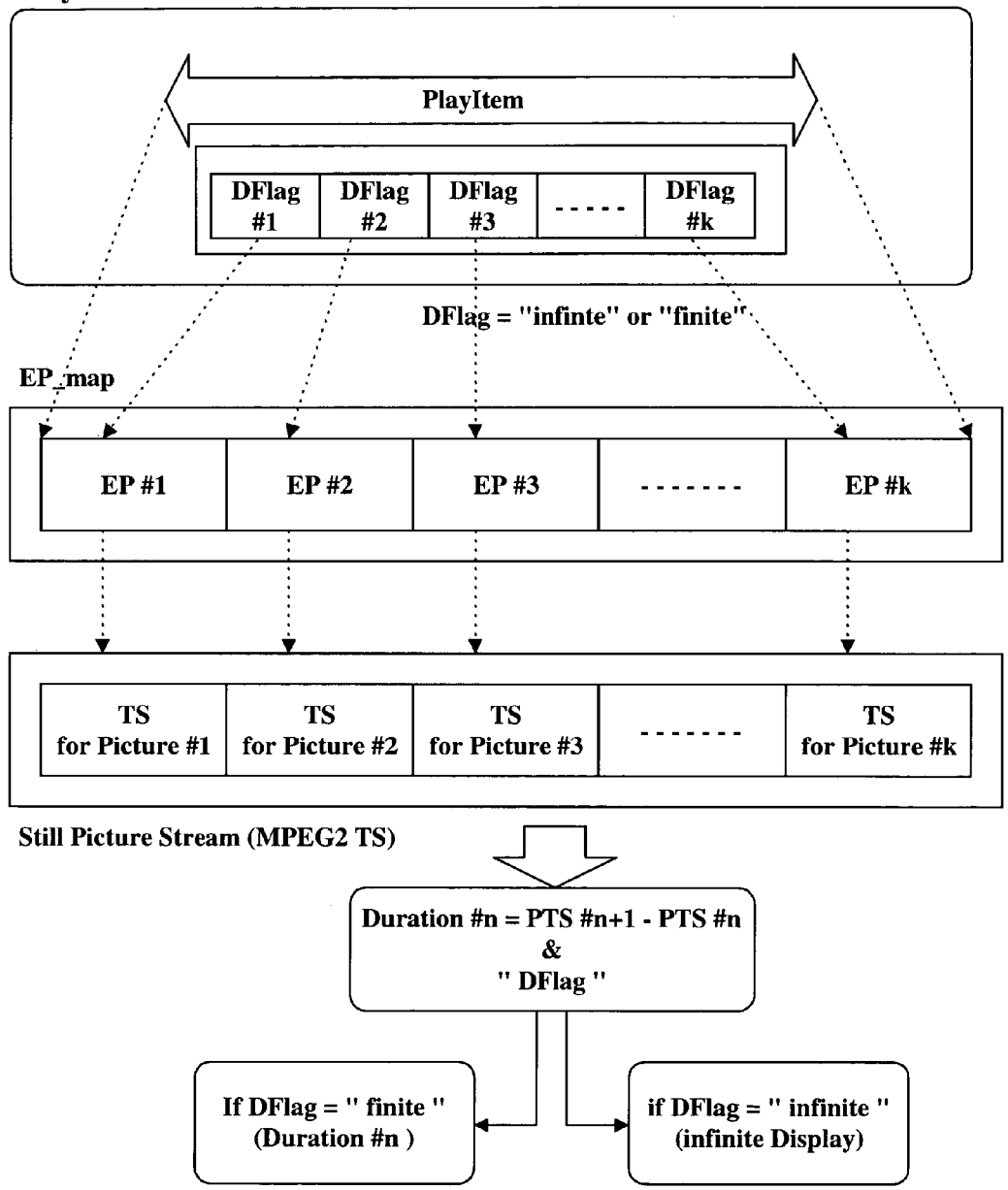

Another embodiment of a data structure and method for managing still images of a high-density recording medium according to the present invention is illustrated in FIG. 8. As shown, a playitem for play control of a still picture file is recorded and managed in a playlist. Duration flags, each of which indicates whether to reproduce the data stream of a still picture unit linked to each entry point with infinite presentation duration or finite presentation duration, are recorded and managed in the form of a list within the playitem.

Here, the VDP system 12 may check the duration flag linked to the entry point corresponding to the specified still picture, if the duration flag has a value indicating infinite presentation duration, the VDP system 12 reproduces the corresponding still picture and then waits for the key input of the user without having to perform the PTS difference calculation.

On the other hand, when the duration flag has a value indicating finite presentation duration, the VDP system 12 calculates the difference between PTSs included in this and the next entry point or PES to determine the presentation duration for the corresponding still picture. The VDP system then reproduces the corresponding still picture until either the elapse of the presentation duration or key input of the user.

Figure 9:
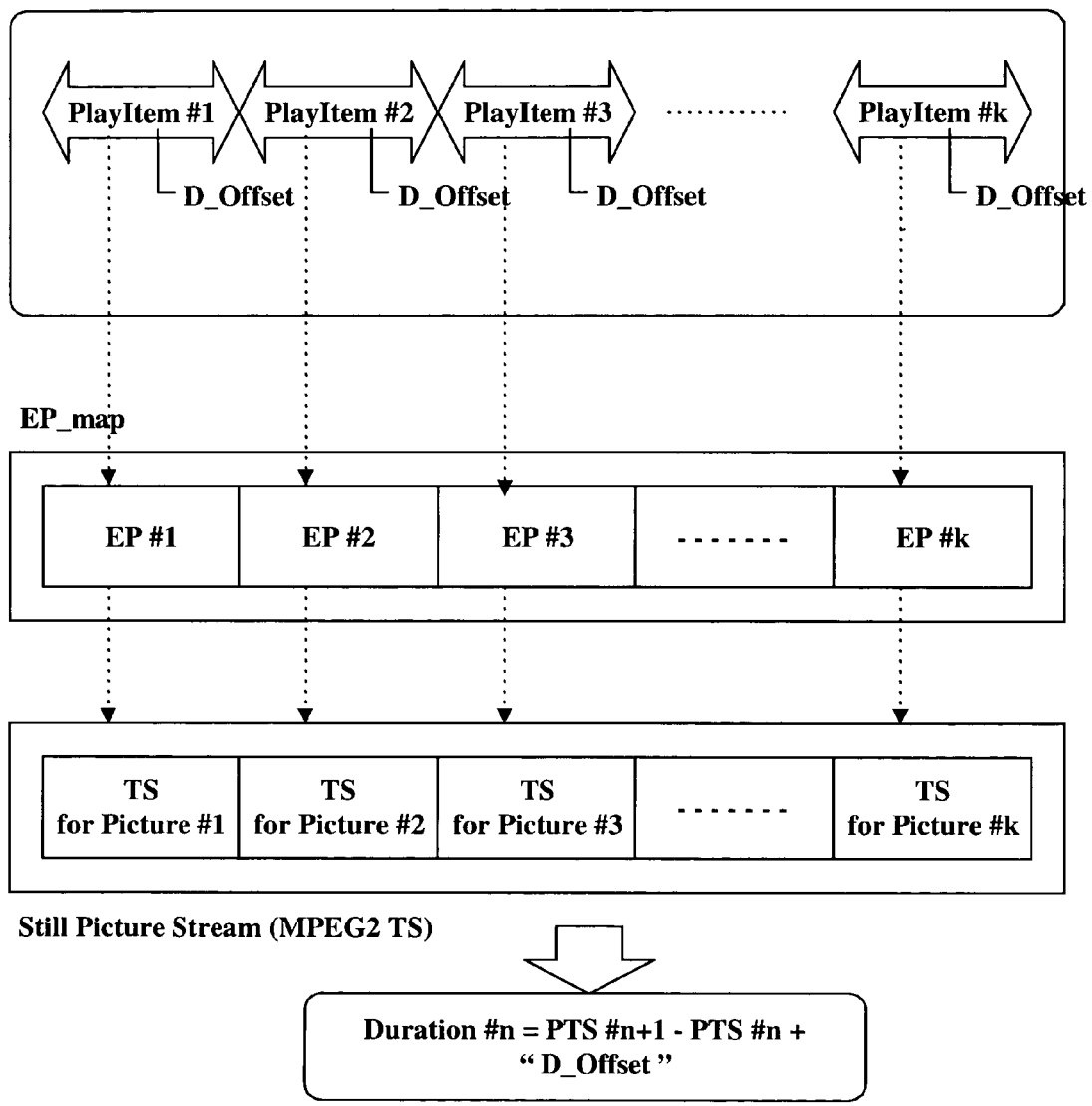

FIG. 9 illustrates another embodiment of a data structure and method for managing still images of a high-density recording medium according to the present invention. As shown, a playlist includes a plurality of playitems corresponding to respective entry points. Each of the playitems includes a duration offset value for adjusting presentation duration of the corresponding still picture.

According to this embodiment, the VDP system 12 calculates the difference between the PTSs included in the entry points or the PESs as described above and determines an initial presentation duration for the corresponding still picture. The VDP system 12 then adds the duration offset value to the initial presentation duration to determine a final presentation duration for the corresponding still picture. The data stream of a still picture unit is reproduced according to either the elapse of the final presentation duration or key input of the user.

Figure 10:
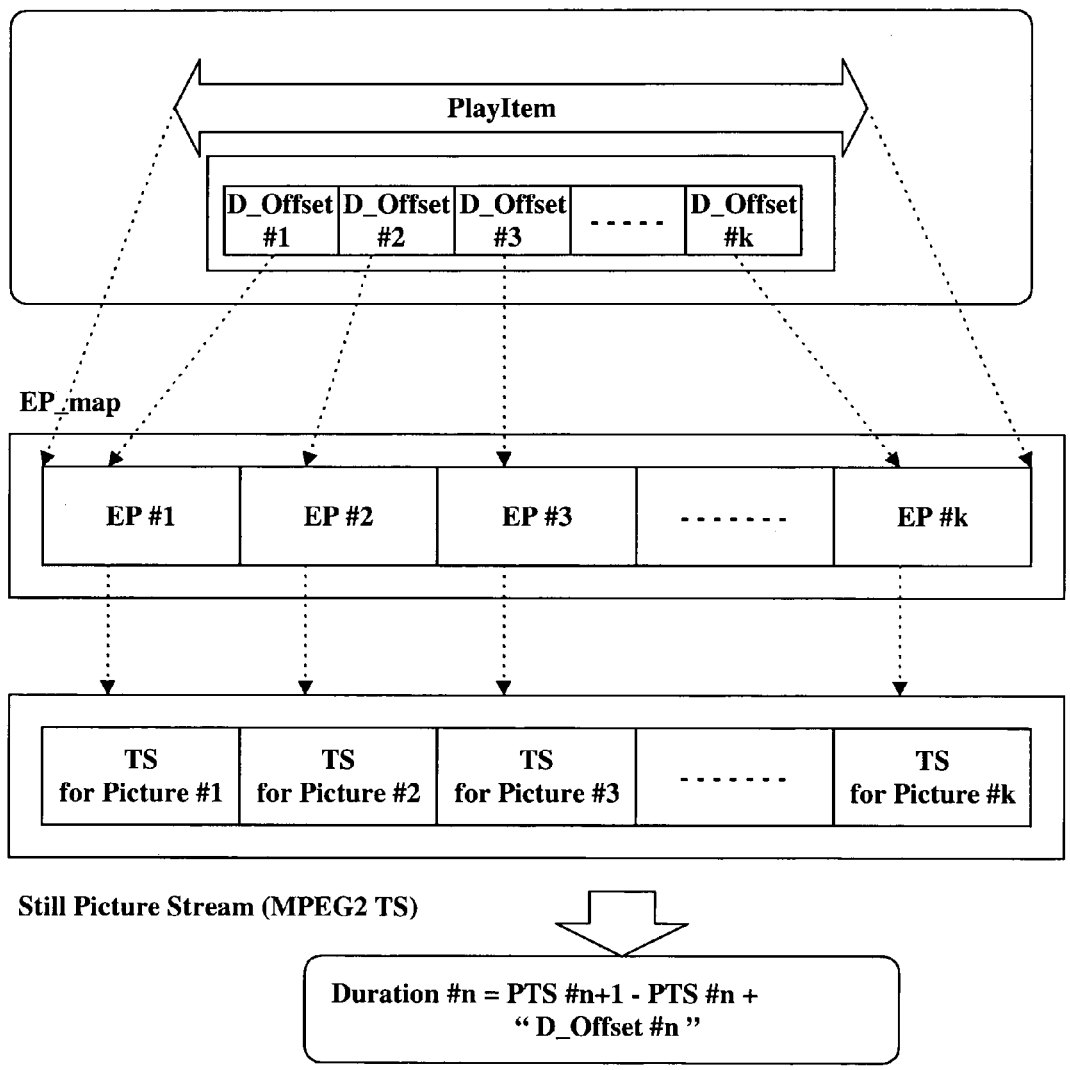

In another embodiment of the present invention, as shown in FIG. 10, a plurality of duration offset values corresponding to respective entry points are recorded and managed in the form of a list in a playitem.

According to this embodiment, the VDP system 12 calculates the difference between the PTSs included in the entry points or the PESs as described above and determines an initial presentation duration for the corresponding still picture. The VDP system 12 then adds the duration offset value linked to the corresponding entry point from the duration offset list to the initial presentation duration to determine a final presentation duration for the corresponding still picture. The data stream of a still picture unit is reproduced according to either the elapse of the final presentation duration or key input of the user.

Figure 11:
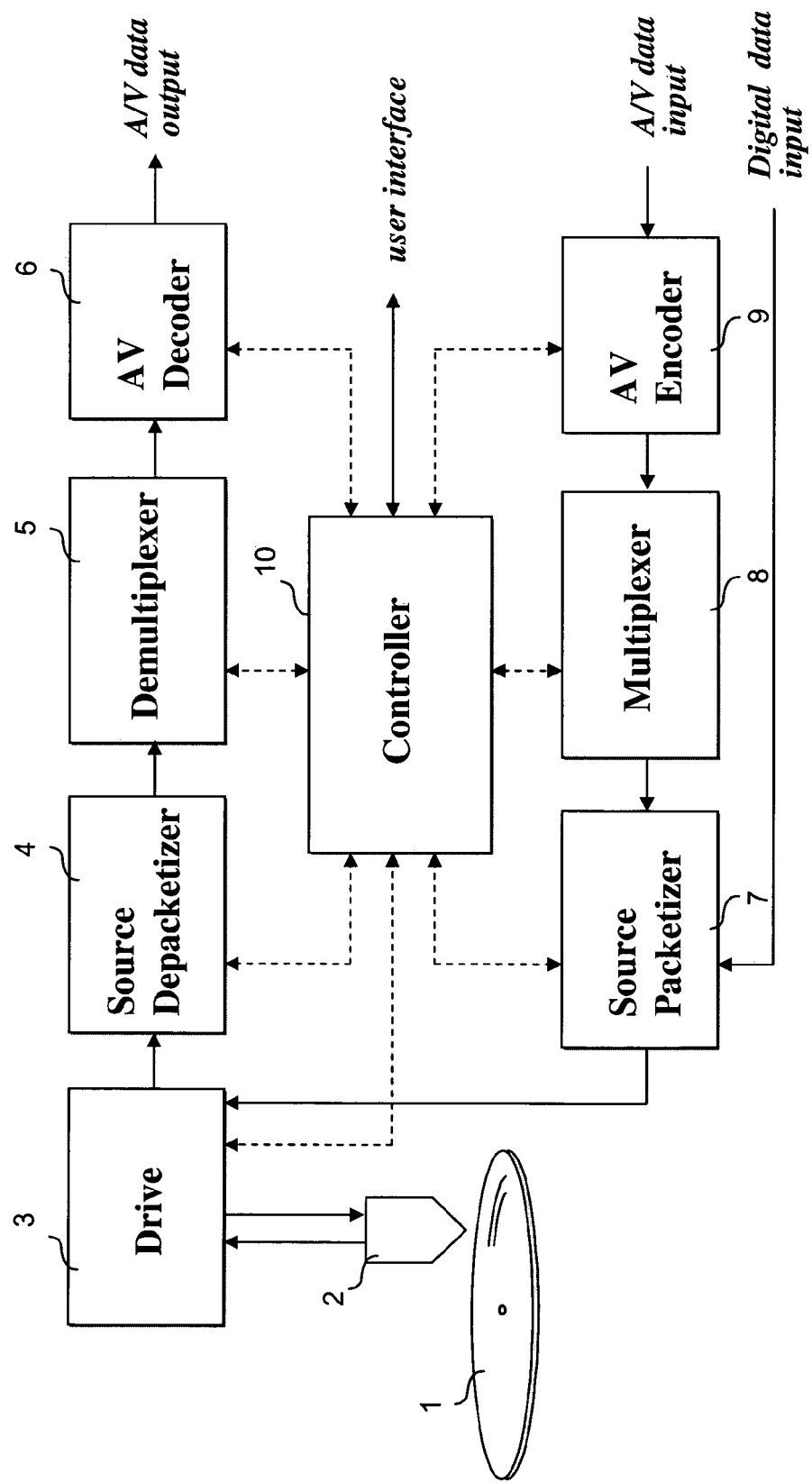
FIG. 11 illustrates another embodiment of a recording and reproducing apparatus according to the present invention.

FIG. 11 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 11, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-5 and 7-10 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 11 has been described as a recording and reproducing apparatus, it will be understood that only a recording or only a reproducing apparatus may be provided using those portions of FIG. 11 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

The method of managing still images for a high-density recording medium in accordance with the invention provides various still control operations such as duration management and allows effective linked reproduction of still images along with associated subtitle data or graphic images.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer-readable medium having an executable data structure for managing reproduction duration of at least one still picture recorded thereon by a reproducing apparatus, comprising:
   a data area storing a first stream file including presentation data and a second stream file including audio data for simultaneous reproduction with the presentation data asynchronously, the presentation data being multiplexed into a transport stream and being divided into a number of still picture units, the still picture units including at least one still picture and associated graphic data, the presentation data not including audio data, the at least one still picture and associated graphic data in the still picture units being reproduced synchronously;
   a clip information area storing a first clip information file and a second clip information file, the first clip information file and the second clip information file being related to the first stream file and the second stream file, respectively, the first clip information file including a type indicator, the type indicator identifying that the first clip information file is related to presentation of the at least one still picture; and
   a playlist area storing at least one playlist file, the at least one playlist file including at least one playitem and at least one sub-playitem, the at least one playitem indicating an in-point and out-point of the first stream file for reproducing the presentation data and providing first and second duration information for display of the at least one still picture in the still picture units, the at least one sub-playitem indicating an in-point and out-point of the second stream file for reproducing the audio data, the start time of the audio data using the at least one sub-playitem being independent from the still picture units using the at least one playitem,
   wherein the first duration information indicates whether to display the at least one still picture for one of a finite and an infinite period of time, and
   the second duration information indicates a length of time to display the at least one still picture when the first duration information indicates to display the at least one still picture for a finite period of time.

2. The non-transitory computer-readable medium of claim 1, wherein the presentation data is multiplexed into the transport stream on a still picture unit by still picture unit basis.

3. The non-transitory computer-readable medium of claim 1, wherein each elementary stream of the at least one still picture and associated graphic data is aligned within the still picture units.

4. The physical non-transitory computer-readable medium of claim 3, wherein each elementary stream is a packetized elementary stream.

5. The non-transitory computer-readable medium of claim 4, wherein each still picture unit includes one packet from each packetized elementary stream.

6. The non-transitory computer-readable medium of claim 1, wherein each still picture unit includes only one still picture.

7. The non-transitory computer-readable medium of claim 1, further comprising:
   a playlist directory including only the playlist files.

8. A method of recording a data structure for managing reproduction duration of at least one still picture on a recording medium, comprising:
   recording by a recording device a first stream file including presentation data and a second stream file including audio data for simultaneous reproduction with the presentation data asynchronously, the presentation data being multiplexed into a transport stream and being divided into a number of still picture units, the still picture units including at least one still picture and associated graphic data, the presentation data not including audio data, the at least one still picture and associated graphic data in the still picture units being reproduced synchronously;
   recording by a recording device at least one playlist file, the at least one playlist file including at least one playitem and at least one sub-playitem, the at least one playitem indicating an in-point and out-point of the first stream file for reproducing the presentation data and providing first and second duration information for display of the at least one still picture in the still picture units, the at least one sub-playitem indicating an in-point and out-point of the second stream file for reproducing the audio data, the start time of the audio data using the at least one sub-playitem being independent from the still picture units using the at least one playitem; and
   recording by a recording device a first clip information file and a second clip information file, the first clip information file and the second clip information file being related to the first stream file and the second stream file, respectively, the first clip information file including a type indicator, the type indicator identifying that the first clip information file is related to presentation of the at least one still picture,
   wherein the first duration information indicates whether to display the at least one still picture for one of a finite and an infinite period of time, and
   the second duration information indicates a length of time to display the at least one still picture when the first duration information indicates to display the at least one still picture for a finite period of time.

9. The method of claim 8, wherein each still picture unit includes only one still picture.

10. A method of reproducing a data structure for managing reproduction duration of at least one still picture recorded on a recording medium, comprising:
   reproducing by a reproducing device a first stream file including presentation data and a second stream file including audio data for simultaneous reproduction with the presentation data asynchronously, the presentation data being multiplexed into a transport stream and being divided into a number of still picture units, the still picture units including at least one still picture and associated graphic data, the presentation data not including audio data, the at least one still picture and associated graphic data in the still picture units being reproduced synchronously;
   reproducing by a reproducing device at least one playlist file, the at least one playlist file including at least one playitem and at least one sub-playitem, the at least one playitem indicating an in-point and out-point of the first stream file for reproducing the presentation data and providing first and second duration information for display of the at least one still picture in the still picture units, the at least one sub-playitem indicating an in-point and out-point of the second stream file for reproducing the audio data, the start time of the audio data using the at least one sub-playitem being independent from the still picture units using the at least one playitem; and reproducing by a reproducing device a first clip information file and a second clip information file, the first clip information file and the second clip information file being related to the first stream file and the second stream file, respectively, the first clip information file including a type indicator, the type indicator identifying that the first clip information file is related to presentation of the at least one still picture, wherein the first duration information indicates whether to display the at least one still picture for one of a finite and an infinite period of time; and the second duration information indicates a length of time to display the at least one still picture when the first duration information indicates to display the at least one still picture for a finite period of time.

11. The method of claim 10, wherein each still picture unit includes only one still picture.

12. The method of claim 10, wherein the recording medium is a read-only recording medium.

13. The method of claim 10, wherein the recording medium is a recordable recording medium.

14. An apparatus for recording a data structure for managing reproduction duration of at least one still picture on a recording medium, comprising:

a pick up configured to record data on the recording medium;

a controller configured to control the pick up to record a first stream file including presentation data and a second stream file including audio data for simultaneous reproduction with the presentation data asynchronously, the presentation data being multiplexed into a transport stream and being divided into a number of still picture units, the still picture units including at least one still picture and associated graphic data, the presentation data not including audio data, the still picture and associated graphic data in the still picture units being reproduced synchronously;

the controller configured to control the pick up to record at least one playlist file, the at least one playlist file including at least one playitem and at least one sub-playitem, the at least one playitem indicating an in-point and out-point of the first stream file for reproducing the presentation data and providing first and second duration information for display of the at least one still picture in the still picture units, the at least one sub-playitem indicating an in-point and out-point of the second stream file for reproducing the audio data, the start time of the audio data using the at least one sub-playitem being independent from the still picture units using the at least one playitem; and the controller configured to control the pick up to record a first clip information file and a second clip information file, the first clip information file and the second clip information file being related to the first stream file and the second stream file, respectively, the first clip information file including a type indicator, the type indicator identifying that the first clip information file is related to presentation of the at least one still picture, wherein the first duration information indicates whether to display the at least one still picture for one of a finite and an infinite period of time, and the second duration information indicates a length of time to display the at least one still picture when the first duration information indicates to display the at least one still picture for a finite period of time.

15. The apparatus of claim 14, wherein each still picture unit includes only one still picture.

16. An apparatus for reproducing a data structure for managing reproduction duration of at least one still picture recorded on a recording medium, comprising:

a pick up configured to reproduce data recorded on the recording medium;

a controller configured to control the pick up to reproduce a first stream file including presentation data and a second stream file including audio data for simultaneous reproduction with the presentation data asynchronously, the presentation data being multiplexed into a transport stream and being divided into a number of still picture units, the still picture units including at least one the still picture and associated graphic data, the presentation data not including audio data, the at least one still picture and associated graphic data in the still picture units being reproduced synchronously;

the controller configured to control the pick up to reproduce at least one playlist file, the at least one playlist file including at least one playitem and at least one sub-playitem, the at least one playitem indicating an in-point and out-point of the first stream file for reproducing the presentation data and providing first and second duration information for display of the at least one still picture in the still picture units, the at least one sub-playitem indicating an in-point and out-point of the second stream file for reproducing the audio data, the start time of the audio data using the at least one sub-playitem being independent from the still picture units using the at least one playitem; and the controller configured to control the pick up to reproduce a first clip information file and a second clip information file, the first clip information file and the second clip information file being related to the first stream file and the second stream file, respectively, the first clip information file including a type indicator, the type indicator identifying that the first clip information file is related to presentation of the at least one still picture, wherein the first duration information indicates whether to display the at least one still picture for one of a finite and an infinite period of time, and the second duration information indicates a length of time to display the at least one still picture when the first duration information indicates to display the at least one still picture for a finite period of time.

17. The apparatus of claim 16, wherein each still picture unit includes only one still picture.

18. The apparatus of claim 16, wherein the recording medium is a read-only recording medium.

19. The apparatus of claim 16, the recording medium is a recordable recording medium.

* * * * *